Nov. 17, 1931. L. BOGGIANO-PICO 1,832,179

PLANT FOR TREATING ORGANIC REFUSE

Filed Nov. 10, 1928

Inventor:
Luigi Boggiano-Pico
by
Attorney

Patented Nov. 17, 1931

1,832,179

UNITED STATES PATENT OFFICE

LUIGI BOGGIANO-PICO, OF GENOA, ITALY

PLANT FOR TREATING ORGANIC REFUSE

Application filed November 10, 1928, Serial No. 318,577, and in Italy November 16, 1927.

This invention relates to apparatus for the conversion of organic refuse into useful substances by means of a fermentation activated or stimulated by an injection of air into a moistened mass of said refuse, and it comprises an apparatus which embodies all the means for ensuring the most complete and quick fermentation of the entire mass and for facilitating reliable charging of the material and recovery of the gases.

A construction of apparatus according to the invention is illustrated by way of example in the accompanying drawings, in which:—

Figure 1:
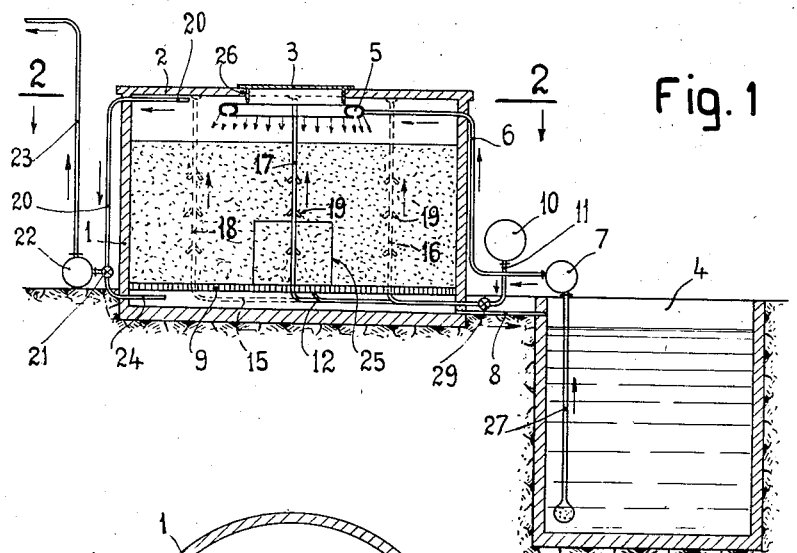
Figure 2:
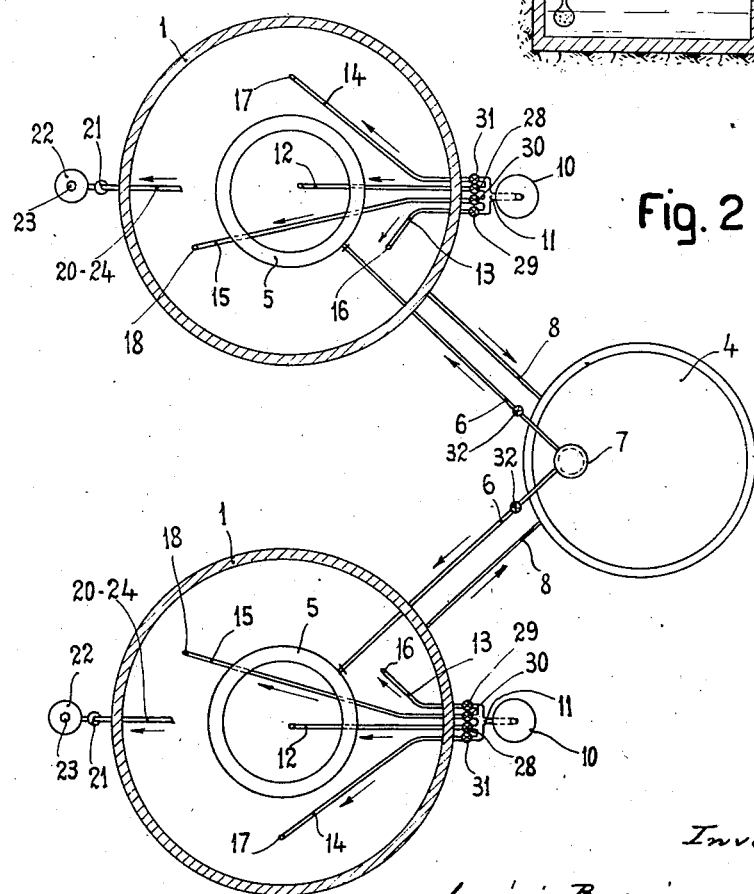

Figure 1 is a vertical section of the apparatus, showing a fermentation chamber and a tank for sewage water intended to moisten the mass, and Figure 2 is a plan view of the complete apparatus, partly in section on line 2—2 of Figure 1.

In said drawings, 1 is a fermentation chamber which is made of the required capacity and preferably of a relatively small height so as facilitate the access of trucks by means of a ramp (not shown) to an upper platform 2 which provides the roof of said chamber and has an opening 26 for the introduction of the refuse. This opening 26 is closed by a cover 3 which could be mounted so as to enable it to turn or to slide, and which is manipulated in any desired suitable manner.

4 is a tank which is generally arranged at a lower level than the bottom of the chamber 1 and may, if desired, be used in connection with one or more additional chambers, as indicated in Figure 2.

In the upper part of the interior of the chamber 1 is arranged an annular sprayer 5 attached to the end of a pipe 6 rising from the bottom of tank 4. A pump 7 delivers through the said pipe to the top of the chamber 1 the liquid contained in the tank 4, the suction side of said pump having connected to it a pipe 27.

Into the lowest part of the chamber 1, below a metal grate 9, opens a pipe 8 leading to the tank 4. This pipe is intended to return to the tank the excess liquid introduced into the chamber and which drips through the grate into the space therebeneath from the refuse supported on the grate.

The grate 9 is located a short distance above the floor of the chamber 1, as will be understood, and under it are arranged pipes hereinafter referred to for the admission of compressed air. This air is supplied by a reservoir or by a compressor 10 from which leads a main pipe 11 that divides, in the construction illustrated, into four branches 12, 13, 14, 15 each provided with a valve 28, 29, 30, 31 for its control.

The branch 12 terminates under the grate 9, whilst the other ones are connected respectively to vertical columns or risers 16, 17, 18 uniformly distributed in the chamber and extending above half its height.

These columns 16, 17, 18 are preferably closed at their upper ends and provided with downwardly directed outlet nozzles 19. The number of these columns is that required for distributing the air throughout the whole chamber and they may be utilized, if desired, for supporting the roof 2 of the said chamber.

The mass of material charged into the chamber and resting on the grate 9 is thus traversed by the columns 16, 17, 18 which, by means of the nozzles 19, inject at the same time at several points of the mass a controlled amount of compressed air delivered by the compressor 10, a uniform fermentation of the mass thus being ensured.

At the top of the chamber 1 opens a pipe 20 intended for the discharge of the gases released during the fermentation. This pipe 20 may be connected through a multi-way valve 21 to an exhauster 22 connected by a pipe 23 to a reservoir or gas holder (not shown) in which the gases generated by the fermentation are collected.

The suction side of the exhauster 22 may also be connected to another pipe 24 which terminates in the chamber 1 under the grate 9, preferably through the same valve 21 which controls its connection with pipe 20.

In this way it is possible, by means of the exhauster 22, to discharge from below the gases contained in the chamber, owing to which the carbon dioxide can be eliminated from the chamber, thus ensuring safety of the staff employed for the discharge after the operation is finished; and at the same time, owing to the elimination of the carbon dioxide, improving the fermentation and the character of the fertilizer obtained.

Chamber 1 is also provided near its base with a lateral opening 25 through which the material is withdrawn after the operation is finished, and at said opening there may be arranged a conveyor apparatus (not shown) of any suitable kind for facilitating the discharge of the material.

In operation, the refuse is charged into the chamber 1 through opening 26 after the removal of cover 3 whereafter said cover is again put in position; and into the upper portion of the chamber, by means of the pump 7, is introduced a quantity of sewage water contained in tank 4, to moisten the refuse, the excess liquid returning to tank 4 through the pipe 8. Afterwards air is injected by means of the compressor 10 under the grate 9 and into the columns 16, 17, 18, from which the air spreads throughout the whole mass of the charge.

The fermentation of the charge is thus artificially stimulated and it is completed within about 30 days.

The progress of fermentation may be regulated in accordance with indications supplied by suitable instruments (thermometer and hygrometer) arranged in the different zones of the chamber, by injecting different quantities of air into the different pipes 12, 13, 14, 15 by means of valves 28, 29, 30, 31.

During the whole course of fermentation the exhauster 22 connected to the pipe 20 is operated from time to time in order to deliver into a gas holder (not shown) the gases which accumulate in chamber 1; and during the course of the operation, or when it is finished, before or during the discharge operations, the exhaust will also take place through pipe 24 to remove from the bottom the gases and more particularly the carbon dioxide. This makes it possible at the same time to eliminate any risk to the staff and any leakage of the gases outwardly.

With this installation it is possible to treat, without any exhalations, any kind of refuse, more particularly sweepings, dead animals, refuse from slaughter houses, damaged provisions such as cheese, eggs, fish, etc. as well as large quantities of sewage water. A dry substance in the form of an aseptic powder is ultimately obtained, from which foreign matters such as pieces of glass, bones, pieces of metal, etc. can be separated without any danger and with the greatest facility, by appropriate mechanical devices.

In this way is is unnecessary first to sort out the sweepings, which is a great advantage from the hygienic point of view.

The material obtained by the fermentation is a good manure which can be utilized at once, and the gases collected during the fermentation constitute utilizable substances.

What I claim as my invention and desire to secure by United States Letters Patent is:—

1. An installation for the treatment of organic refuse by fermentation, comprising a chamber having an opening for charging refuse therein and another opening for removing treated material therefrom, hollow uprights mounted in said chamber and having lateral outlets, separate pipes for supplying a gas to said hollow uprights for its distribution in the charge and to the bottom of said chamber, supply means for delivering a liquid to the chamber to be distributed in said charge, and outlet means for discharging excess liquid from said chamber.

2. An installation for the treatment of organic refuse by fermentation, comprising a chamber having an opening for charging refuse therein and another opening for removing treated material therefrom, a perforated partition at the bottom of said chamber supporting the charge and providing a free space below it, hollow uprights mounted in said chamber and having lateral outlets, separate pipes for supplying a gas to said space and to said hollow uprights for its distribution in said charge, supply means for delivering a liquid to the chamber to be distributed therein, and outlet means for discharging excess liquid from said chamber.

3. An installation for the treatment of organic refuse by fermentation, comprising a chamber having an opening for charging refuse therein and another opening for removing treated material therefrom, hollow uprights mounted in said chamber and having lateral outlets, separate valve-controlled pipes for supplying a gas to the individual uprights for its controlled distribution in the charge and to the bottom of said chamber, supply means for delivering a liquid to the chamber to be distributed therein in said charge, and outlet means for discharging excess liquid from said chamber.

4. An installation for the treatment of organic refuse by fermentation, comprising a chamber having an opening for charging refuse therein and another opening for removing treated material therefrom, a perforated partition at the bottom of said chamber supporting the charge and providing a free space below it, hollow uprights mounted in said chamber and having lateral outlets, separate valve-controlled pipes for supplying a gas to said space and to the individual uprights for its controlled distribution in said charge, supply means for delivering a liquid to the chamber to be distributed in said charge and outlet means for discharging excess liquid from said chamber.

5. An installation for the treatment of organic refuse by fermentation, comprising a chamber having an opening for charging refuse therein and another opening for removing treated material therefrom, a perforated partition at the bottom of said chamber supporting the charge and providing a free space below it, means for supplying a gas to said free space and to different points of said charge, an exhauster for withdrawing gases contained in said chamber directly from said free space, supply means for delivering a liquid to the chamber to be distributed in said charge, and outlet means for discharging the excess liquid from said chamber.

6. An installation for the treatment of organic refuse by fermentation, comprising a chamber having an opening for charging refuse therein and another opening for removing treated material therefrom, a perforated partition at the bottom of said chamber supporting the charge and providing a free space below it, hollow uprights mounted in said chamber and having lateral outlets, separate pipes for supplying a gas to said space and to the individual uprights for its distribution through said lateral outlets into said charge, an exhauster for withdrawing gases contained in said chamber directly from said free space, supply means for delivering a liquid to the chamber to be distributed in said charge, and outlet means for discharging excess liquid from said chamber.

7. An installation for the treatment of organic refuse by fermentation, comprising a chamber having an opening for charging refuse therein and another opening for removing treated material therefrom, a perforated partition at the bottom of said chamber supporting the charge and providing a free space below it, separate means for supplying a gas to said space and to different points of said charge, and exhauster for withdrawing gases contained in said chamber selectively from said space and from the chamber top, supply means for delivering a liquid to said chamber to be distributed in said charge, and outlet means for discharging excess liquid from said chamber.

8. An installation for the treatment of organic refuse by fermentation, comprising a chamber having an opening for charging refuse therein and another opening for removing treated material therefrom, a perforated partition at the bottom of said chamber supporting the charge and providing a free space below it, hollow uprights mounted in said chamber and having lateral outlets, separate valve-controlled pipes, for supplying a gas directly to said space and to the individual uprights for its distribution in said charge, an exhauster for withdrawing gases contained in said chamber selectively from said space and from chamber top, supply means for delivering a liquid to said chamber to be distributed in said charge, and outlet means for discharging excess liquid from said chamber.

9. An installation for the treatment of organic refuse by fermentation, comprising a chamber having an opening for charging refuse therein and another opening for removing treated material therefrom, a perforated partition at the bottom of said chamber supporting the charge and providing a free space below it, hollow uprights mounted in said chamber and having downwardly directed lateral outlets, valved means for separately supplying a gas directly to said space and to the individual uprights for its controlled distribution in said charge, an exhauster for withdrawing gases contained in said chamber from said space, supply means for delivering a liquid to said chamber to be distributed in said charge, and outlet means for discharging from said chamber liquid dropping from said charge.

10. An installation for the treatment of organic refuse by fermentation, comprising a chamber having an opening for charging refuse therein and another opening for removing treated material therefrom, a perforated partition at the bottom of said chamber supporting the charge and providing a free space below it, piping for supplying a gas to the charge, and exhausting means for withdrawing gases contained in said chamber; said exhausting means including piping having a branch leading from the top of the chamber and a branch leading directly from said space, an exhauster in the piping, and a multi-way valve for controlling communication between said branches and the exhauster at will.

In testimony whereof I affix my signature.
LUIGI BOGGIANO-PICO.